A. S. HODGES.
PROCESS FOR MOLDING SASH WEIGHTS.
APPLICATION FILED NOV. 20, 1909.
982,818.
Patented Jan. 31, 1911.
5 SHEETS—SHEET 1.
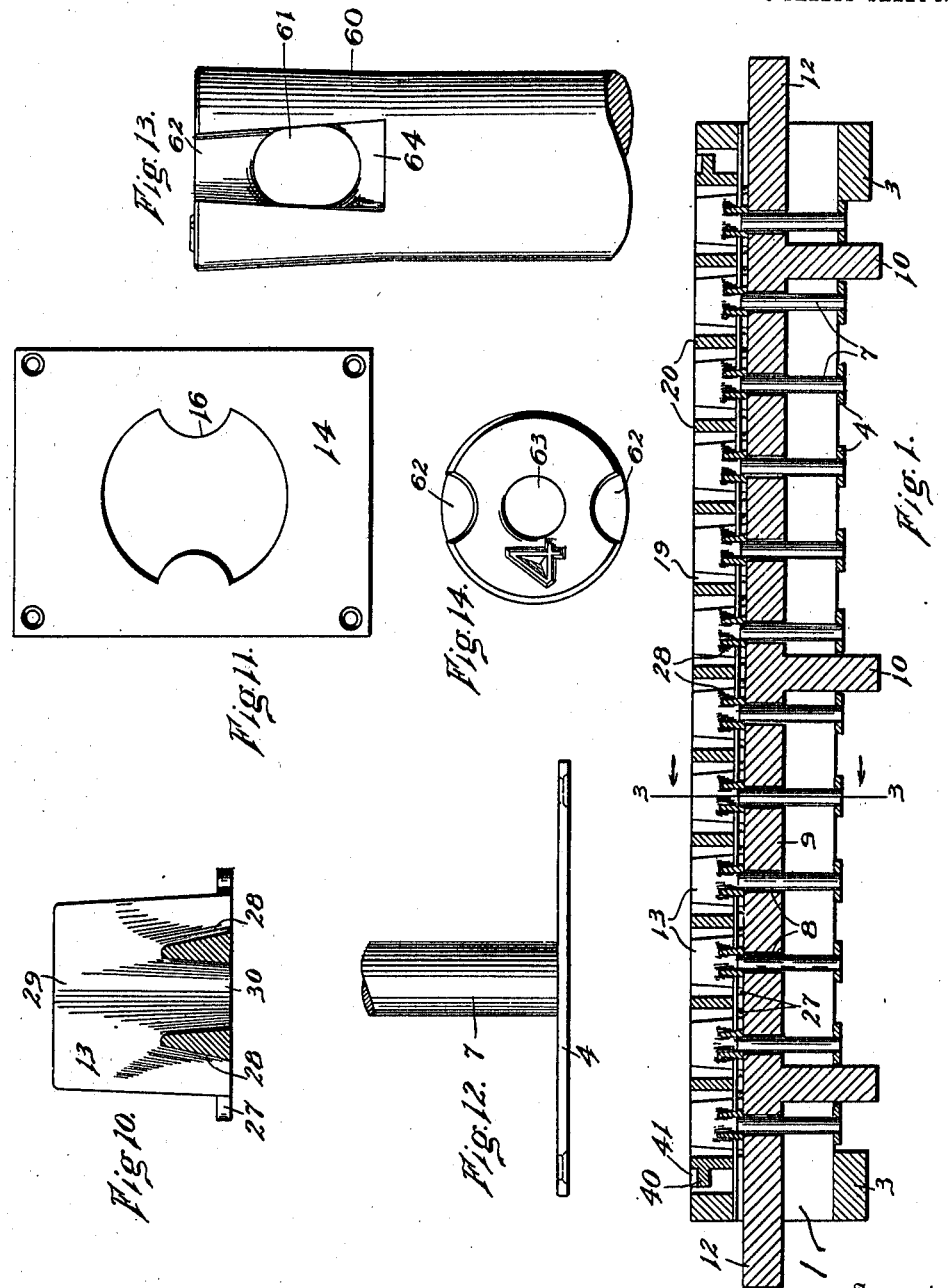

A. S. HODGES.
PROCESS FOR MOLDING SASH WEIGHTS.
APPLICATION FILED NOV. 20, 1909.
982,818.
Patented Jan. 31, 1911.
5 SHEETS—SHEET 2.
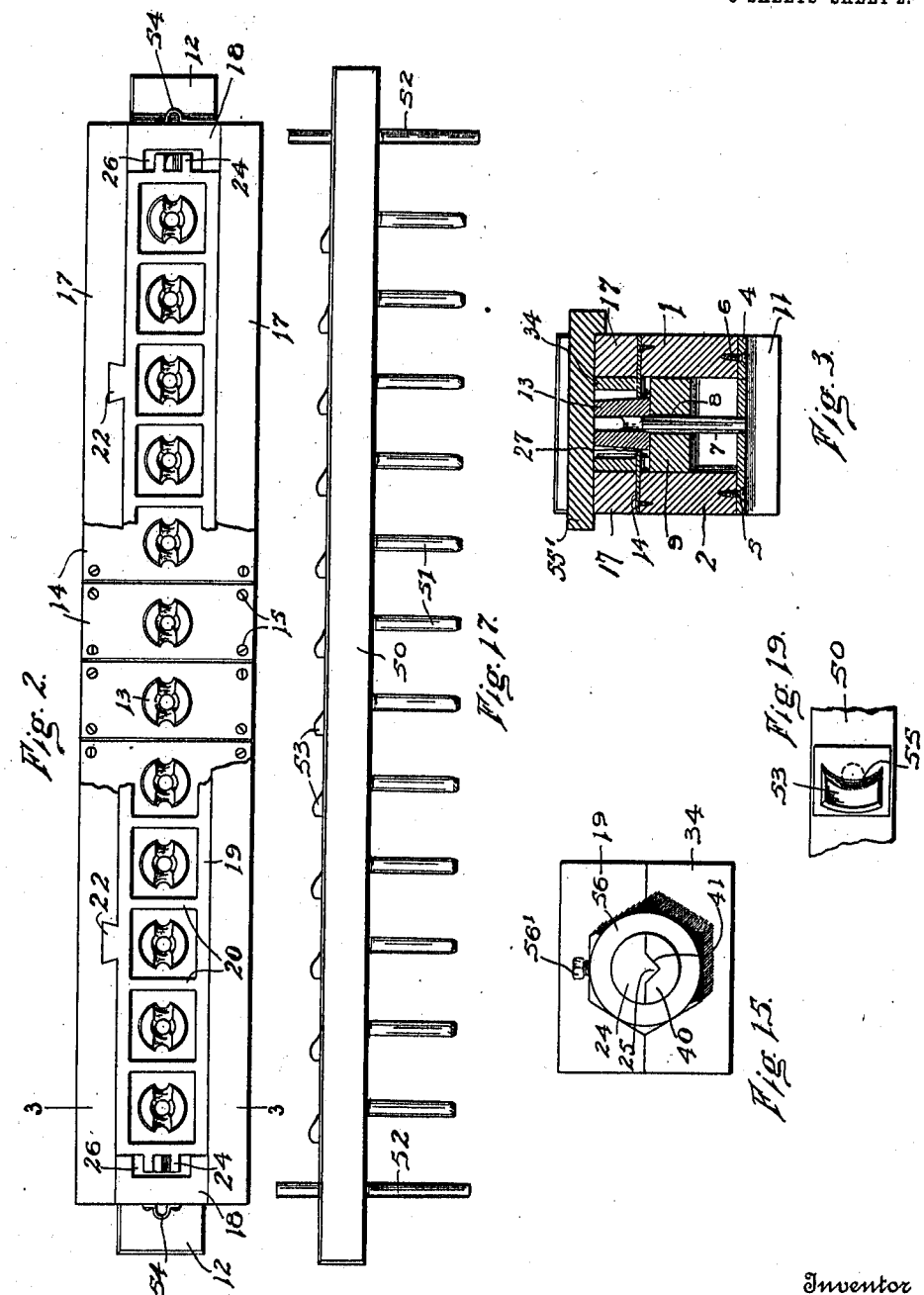
Witnesses
J. S. Freeman.
Inventor
Addison S. Hodges,
By C. L. Parker, Attorney

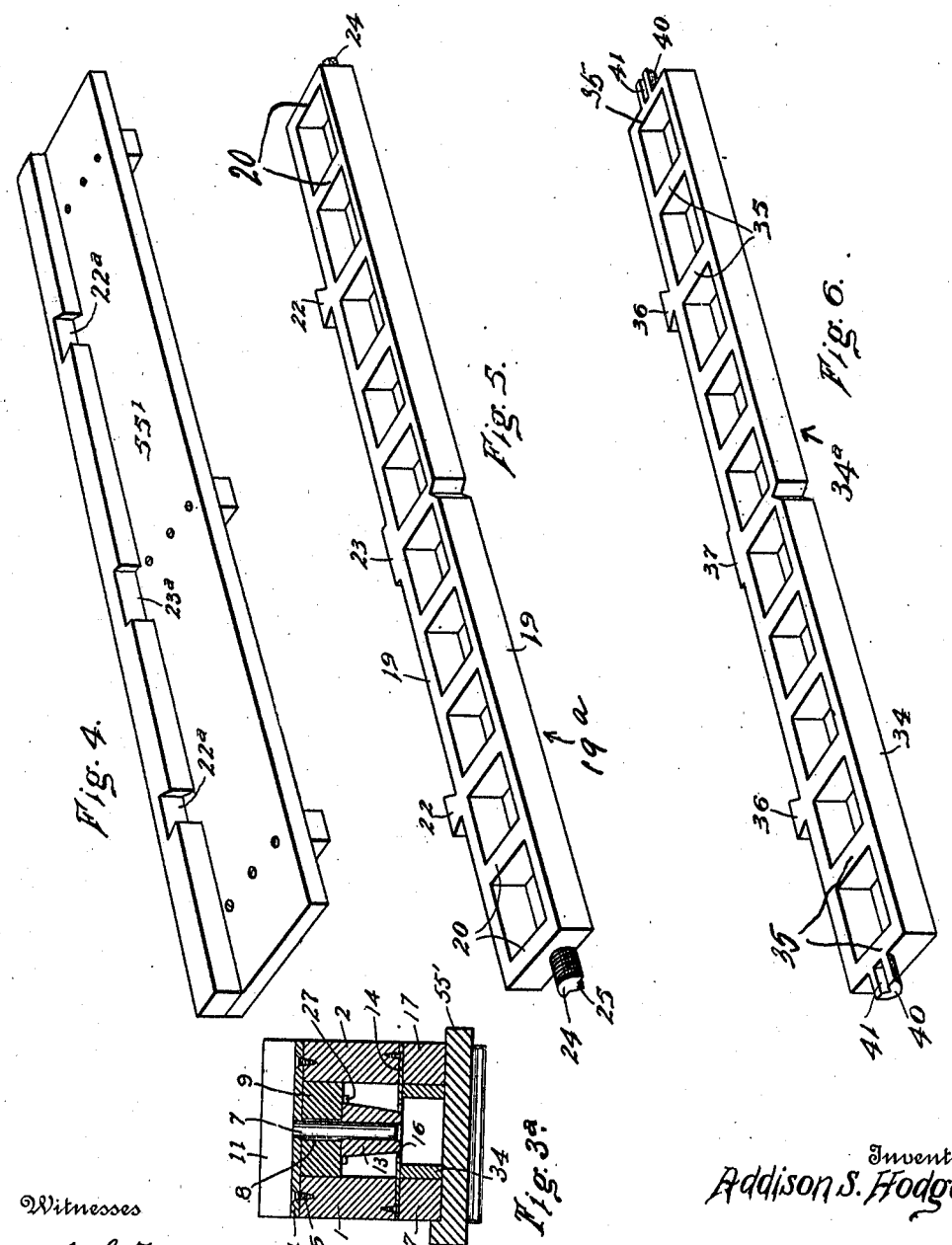

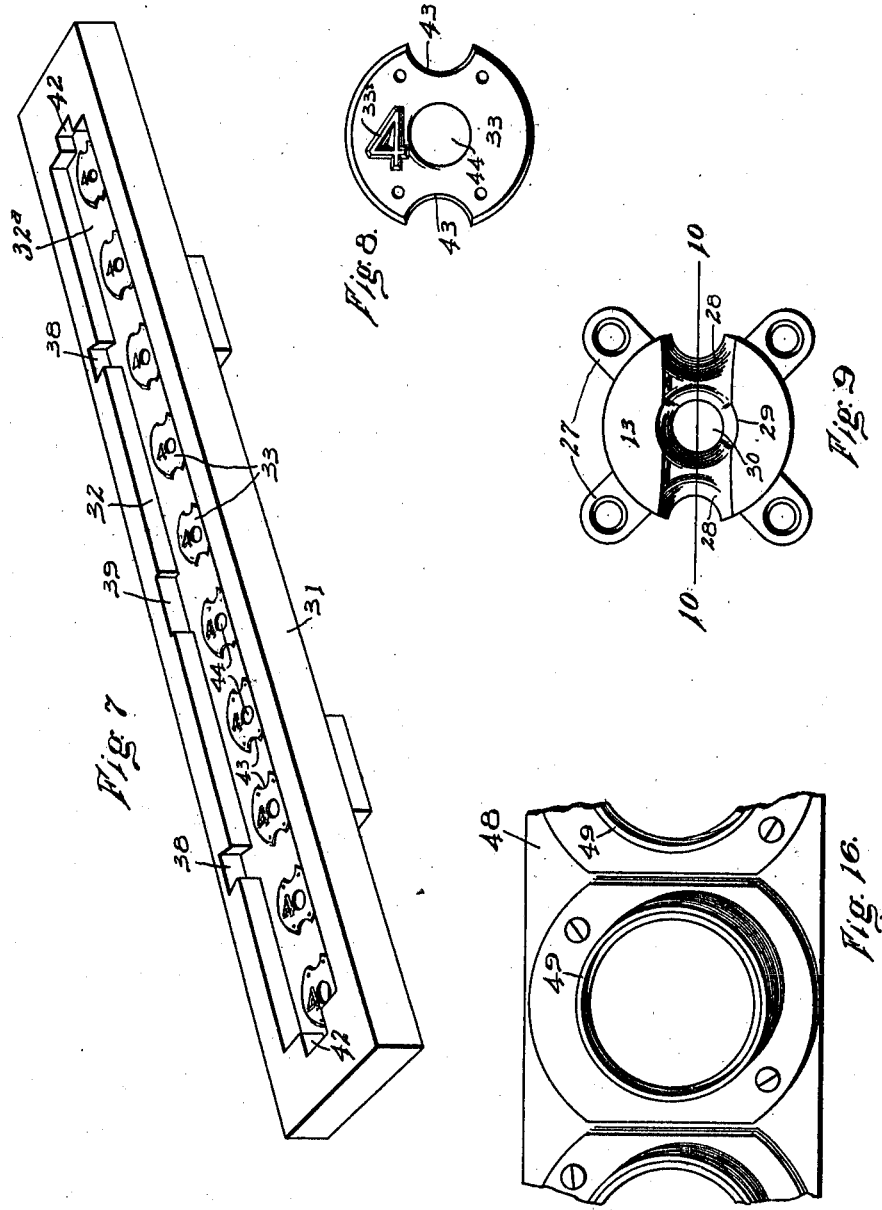

A. S. HODGES.
PROCESS FOR MOLDING SASH WEIGHTS.
APPLICATION FILED NOV. 20, 1909.
982,818.
Patented Jan. 31, 1911.
5 SHEETS—SHEET 5.
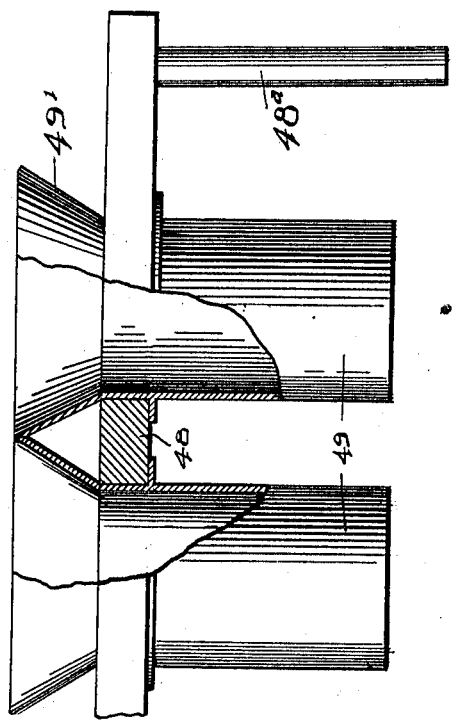
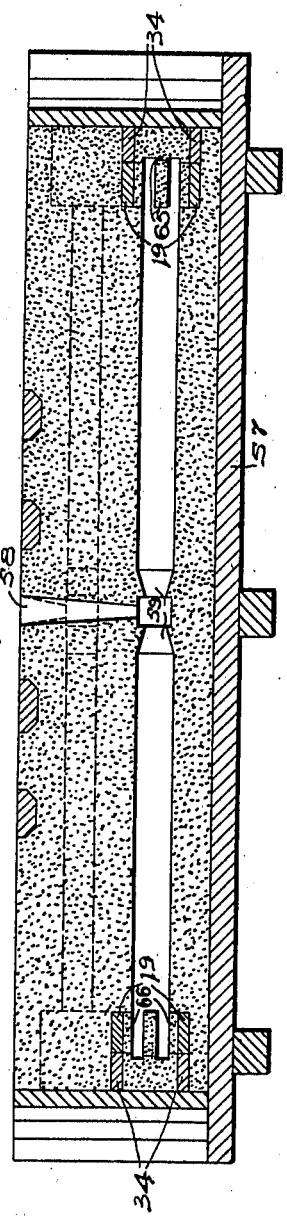
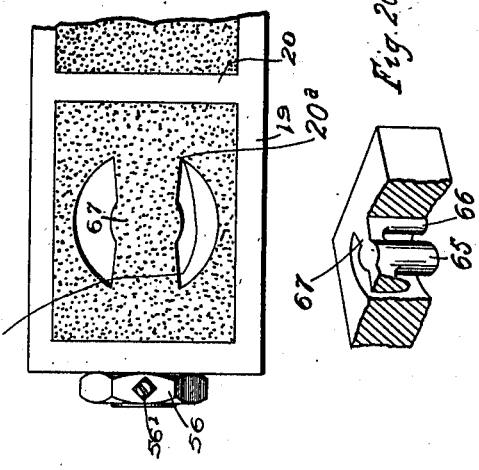
Inventor
Addison S. Hodges,
Witnesses
J. S. Freeman.
By C. L. Parker,
Attorney

UNITED STATES PATENT OFFICE.

ADDISON S. HODGES, OF SOMERVILLE, MASSACHUSETTS, ASSIGNOR TO SEAMLESS SASH WEIGHT COMPANY, OF SALEM, MASSACHUSETTS, A CORPORATION OF MAINE.

PROCESS FOR MOLDING SASH-WEIGHTS.

982,818.     Specification of Letters Patent.     Patented Jan. 31, 1911.

Application filed November 20, 1909. Serial No. 529,075.

*To all whom it may concern:*

Be it known that I, ADDISON S. HODGES, a citizen of the United States, residing at Somerville, in the county of Middlesex and State of Massachusetts, have invented certain new and useful Improvements in Processes for Molding Sash-Weights, of which the following is a specification.

My invention relates to molding processes, and more particularly to an improved process of molding seamless sash weights.

The object of my invention is to provide a process which will simplify and expedite the manufacture of seamless sash weights.

In carrying out my improved process, I preferably employ the apparatus shown in the accompanying drawings, in which:

Figure 1 is a vertical longitudinal sectional view of the device carrying the head-patterns. Fig. 2 is a plan view of the same, parts thereof being broken away. Fig. 3, is a vertical cross-sectional view, taken on line 3—3 of Fig. 1. Fig. 3$^a$ is a view similar to Fig. 3, but showing the parts inverted and the pattern withdrawn from the core-frame. Fig. 4 is a perspective view of the platen for use in connection with the device illustrated in Fig. 1. Fig. 5 is a similar view of the head-core frame. Fig. 6 is a similar view of the figure-core frame. Fig. 7 is a similar view of the figure-pattern support. Fig. 8 is a top plan view of one of the figure-patterns removed. Fig. 9 is a similar view of one of the head-patterns removed. Fig. 10 is a vertical sectional view on line 10—10 of Fig. 9. Fig. 11 is a top plan view of one of the stripping plates. Fig. 12 is an enlarged fragmentary side view of one of the guide pins employed upon the device shown in Fig. 1. Fig. 13 is a side view of the head end of the sash weight. Fig. 14 is an end view of the same. Fig. 15 is an end view of the head-core and figure-core frames, the same being arranged in engagement with each other. Fig. 16 is a fragmentary top plan view of a ramming device. Fig. 17 is a side view of a ramming device, carrying patterns. Fig. 18 is a side view of the device, shown in Fig. 16, portions thereof being broken away. Fig. 19 is an enlarged plan view of one of the patterns shown in Fig. 17. Fig. 20 is a fragmentary plan view of the head-core frame, the same being filled with sand. Fig. 20$^a$ is a perspective view of one of the head cores removed, the same being shown partly in section, such section being taken on the line 20$^a$—20$^a$ of Fig. 20. Fig. 21 is a vertical longitudinal sectional view of the flask.

Briefly, my process consists in forming, by means of head-patterns, head-cores within a head-core-frame, in forming, by means of figure-patterns figure-cores in a similar figure-core-frame, in then removing the patterns, and subsequently binding the core-frames together to form a complete head-molding casing, arranging the casing so produced within a body-mold holding flask, so that the head molds register with the body molds, and pouring the metal so that it will pass from the body molds into the head molds.

Referring to the drawings, which as before stated, show the apparatus best adapted to the carrying out of my process, 1 and 2 designate spaced longitudinal sides, which are connected at their ends by means of the transverse strips 3, secured upon the lower ends thereof. The sides 1 and 2 are further provided upon their lower edges with spaced transverse plates 4, secured thereto as at 5 and 6, respectively. Each of the spaced transverse plates 4 is provided centrally thereof with a vertical guide pin 7, which extends through an opening 8, upon a head-pattern-support 9, which is provided at spaced intervals with depending members 10, arranged between the transverse plates 4. Each of the depending members 10, is provided upon the lower end thereof with a transverse strip 11, which is adapted to engage the sides 1 and 2 between the transverse plates 4. The head-pattern-support 9 is arranged between the sides 1 and 2 and is adapted to have relative vertical movement therewith, the pins 7 and members 10, serving as a guide for the same. The head-pattern-support 9 is limited in its relative movement by means of the transverse strips 11, secured upon said members 10. The head-pattern-support 9 extends longitudinally beyond the sides 1 and 2, as at 12, for a purpose to be hereinafter set forth. The head-pattern-support 9 is further provided upon its upper side with spaced head-patterns 13, which are centrally disposed upon said frame 9, and in longitudinal alinement with each other. By reference to Fig. 1, it will be seen that each successive head-pattern 13, is arranged above and in alinement with a corresponding pin 7, and each of the head patterns 13 has its center in vertical alinement with the central longitudinal axis of its corresponding pin 7. The specific structure of the head patterns 13 will hereinafter be described.

The sides 1 and 2 are provided upon their upper edges with stripping plates 14, secured thereto by means of screws 15 or the like. The stripping plates 14, are arranged to laterally engage with each other and are provided centrally thereof with openings 16, through which the head-patterns 13 extend.

Rigidly secured upon the upper sides of the stripping plates 14 are spaced longitudinal side strips 17, which are connected at their ends by the transverse strips 18, thus forming a rectangular recess above the stripping plates 14, adapted for the reception of a head-core frame 19$^a$, to be hereinafter described. The head-core frame 19$^a$ is rectangular in shape and comprises longitudinal sides 19, connected at their ends and at spaced intervals by transverse strips 20, to form a plurality of square compartments within which extend the head-patterns 13. By reference to Fig. 1, it will be seen that the upper ends of the head-patterns 13 are in horizontal alinement with the longitudinal sides 19 and transverse strips 20, of the head-core-frame 19$^a$. One of the longitudinal sides 19, of the head-core-frame is provided near its ends with laterally extending dove-tailed projections 22 and near its center with a lateral projection 23, which are adapted to fit within corresponding openings upon one of the sides 17, arranged above the stripping plates 14. The opposite side has a V-shaped groove 34$^x$ which serves as a guide in adjusting the head molds in position adjacent the body molds hereinafter referred to. The transverse end strips 20 are provided with outwardly extending screw-threaded trunnions 24 which are substantially semi-cylindrical and are provided upon their straight sides with the tapering portions 25, for a purpose to be explained. The screw-threaded semi-cylindrical trunnions 24 are adapted to be arranged within recesses 26, formed upon the transverse strips 18.

It is to be understood that the head-core-frame 19$^a$ is readily removable from its position upon the stripping plates 14, between the sides 17.

The head-patterns 13 above referred to are alike and I will describe only one of them. Each of the head-patterns 13, is provided at its rear end with apertured ears 27, by means of which the head-pattern is secured to the support 9. The head-pattern 13 is of the form shown in Figs. 9 and 10 and comprise a body of cylindrical shape.

The body of the head-pattern 13 is provided with diametrically arranged longitudinal semi-cylindrical recesses 28, which merge into and are connected by a transverse recess 29, which extends through the upper end of the head-pattern. The head-pattern is further provided with an axial cylindrical opening 30, which merges into said transverse opening 29.

As shown in Fig. 7, I provide a figure-pattern-support 31, which is rectangular and provided with a rectangular recess 32, within which upon a preferably removable bottom plate 32$^a$ are arranged the spaced figure-patterns 33, to be hereinafter described. Each support may be advantageously provided with several bottom plates having different figure patterns. The rectangular recess 32 is adapted to receive a figure-core-frame 34$^a$ shown in Fig. 6, and which comprises spaced longitudinal sides 34, connected at their end and at spaced intervals by the transverse strips 35, for forming a plurality of square compartments. One of the longitudinal sides 34, of the figure-core-frame 34$^a$ is provided with dove-tailed projections 36 and a centrally arranged projection 37, which are adapted to fit within corresponding openings 38 and 39, respectively, upon the frame 31. The opposite side has a V-shaped groove 34$^d$ corresponding to the similarly disposed groove 34$^x$ in the frame 19$^a$. The figure-core-frame, shown in Fig. 6, is provided at the ends thereof with semi-cylindrical and screw threaded trunnions 40, which are provided with recesses 41, upon their upper surfaces, and which are adapted to fit within recesses 42, near the ends of the frame 31.

Each successive figure pattern 33 is adapted to be arranged centrally within each successive square compartment of the figure-core-frame 34$^a$, and it is to be understood that the figure-core-frame is readily removable from the support 31. Each of the figure-patterns 33, as shown in Fig. 8, is circular and is provided with diametrically arranged recesses 43 and a central recess 44, near which is arranged the raised figure 33′. The recesses 43 and the central recess 44 are adapted to register with the recesses 28 and the central opening 30 of the head pattern, shown in Fig. 9, as will hereinafter be apparent.

In carrying out my improved process, the head-core-frame 19$^a$, is arranged upon the stripping plates 14, between the side strips 17. (See Fig. 2.) The molding sand is then put into the compartments formed by the sides 19 and strips 20, and which compartments contain the head-patterns 13. The molding sand is rammed into the compartments of the head-core-frame preferably by means of the ramming device shown in Figs. 16 and 18 which comprises a body support 48, provided with a plurality of spaced circular openings below which and registering with the same are secured open ended cylinders 49 which are extended on the upper side of the support 48 in the form of flaring hoppers 49'. A guide pin 48$^a$ is provided for engagement within bracket 54, which is arranged centrally upon the transverse end strip 18. It is to be understood that the cylinders 49 are adapted to surround the head-patterns 13 and that the sand may be poured through the cylinders 49, during the ramming process, although the sand may be placed in the compartments before the ramming operation if desired. As illustrated in Fig. 17, I provide a second ramming device, comprising a longitudinal body 50, provided at spaced intervals with the ramming pins 51, which are adapted to ram the sand within the openings 30 of pattern 13. The longitudinal body 50 is provided near the ends thereof with guide pins 52, which extend downwardly below the same for engagement within the brackets 54. The guide pins 52 extend upwardly beyond the longitudinal body 50 and are in alinement with a plurality of patterns 53, arranged at spaced intervals upon the body 50. After the removal of the ramming devices, and the leveling off of the sand, the longitudinal body 50, of the second ramming device, is inverted and the upper ends of the guide pins 52 are inserted within guide brackets 54, which are secured to the transverse end strips 18. The patterns 53 are spaced from each other as above stated and are arranged to be directed by the guide pins 57 and the brackets 54, to one end of the transverse openings 28 of the head patterns 13. The patterns 53 are alike and are of the form shown in Fig. 17. The pattern 53, has a curved engaging surface as at 55, which is adapted to form a corresponding impression in the sand. It is to be understood that the size and shape of the patterns 53 may be widely varied to increase or diminish the size of a web or bridge 64 (Fig. 13) which has for its purpose to strengthen the heads of the sash weights. The patterns 53 are removed and a mold board or platen 55' illustrated in Fig. 4, is placed upon the head-core-frame 19$^a$. The entire device is then inverted, which may be conveniently accomplished by grasping the ends 12 of the head-pattern-support 9, and the ends of the platen 55. The operator then raises the ends 12 of the pattern-support 9, which will cause the head-patterns 13 to be withdrawn from the sand within the head-core-frame. The guide pins 7, and the stripping plates 14 remain stationary, until the head-pattern-support 9 is raised to engage the transverse base strips 3, when the entire device may be raised and the head-core-frame will be left upon the platen. The figure-core-frame 34$^a$ shown in Fig. 6, is placed within the recess 32 upon the figure-pattern-support 31 illustrated in Fig. 7. The molding sand is then put into the figure-core-frame and rammed by any suitable means. A mold board or platen similar to the platen shown in Fig. 4, is then placed upon the figure-core-frame 34$^a$ with projections 36 and 37 within recesses 22$^a$ and 23$^a$ and the whole is inverted. The figure-pattern-support 31 is then raised, and the figure-core-frame 34$^a$ will remain upon the platen. The figure-core-frame 34$^a$ is then placed upon the head-core-frame 19$^a$ and a ring 56 is placed upon the threaded trunnions 24 and 40, the ring 56 being provided with a set screw 56' for clamping the trunnions rigidly together. By refernce to Fig. 15, it will be obvious that the portion 25 fits within the recess 41, which tends to prevent relative movement of the trunnions.

By reference to Fig. 21, it will be seen that I employ a flask 57, which is non-divided and similar in construction to that shown and described in my Patent No. 666,671, the same having a central sprue hole 58, leading to the inner ends of core openings 59, or molds which form the bodies of the sash weights. These openings result from the withdrawal of body patterns, and lead to the head-core-frame and figure-core-frame as shown by the numerals 19 and 34 in Fig. 21.

While I have shown my head molding frames in connection with the body flasks shown and described in my Patent No. 666,671 it is to be understood that they may be used in connection with any open ended body flasks and particularly the body flask shown in my said Patent No. 666,671.

I have illustrated in Fig. 13, the upper end 60 of one of the seamless sash weights made by my improved process. The end 60 is provided with a transverse opening 61, which communicates with longitudinal diametrically arranged recesses 62, extending inwardly from the end. The head 60 is further molded with an axial opening 63, which extends between the recesses 62 and communicates with the transverse opening 61. One of the recesses 62 is provided adjacent the body of the weight with a curved web or bridge of material 64, which partly closes the said recesses 62 and strengthens the engagement of the head with the body of the weight.

In Fig. 21 is shown a cross-sectional view of the figure-core-frame and the head-core-frame, in engagement with each other and filled with molding sand and having the patterns removed. In this view is shown central sections of sand 65, which form the axial opening 63, in the head of the weight. The diametrically arranged sections of sand 66, form the recesses 62, and a transverse section of sand 67 forms the transverse opening 61. The portion 64, above referred to, is formed by the impression made by the pattern 53.

It will be noted by reference to Fig. 21, that the central sections of sand 65 of the head-core and of the figure-core abut in a separate plane from that of the abutting edges of the frames 19ª and 34ª. This is due to the fact that the ends of the pins 7 terminate in a plane substantially lower than the upper surface of the stripping plates 14.

The head-core-frame and figure-core-frame designated by the numerals 19 and 34, in Fig. 21 are secured together as above described and are arranged transversely at one end of the flask 57, so that the core-opening 59 for forming the body of the sash weight will register with one of the compartments of the holding core-frame 19ª. The molten metal is then poured into the sprue hole 58 and will accordingly flow through the opening 59 into the core-holding frames designated at 19 and 34. After the molten metal has cooled and hardened, the sand in the flask is broken up and the sash weights removed.

Having fully described my invention, I claim:

1. That improvement in the art of producing seamless sash weights, which comprises the placing of a head-core-frame upon a support carrying head-patterns, so that said head-patterns will be arranged within said head-core-frame, filling the head-core-frame with a core-forming material, forming an impression upon the core adjacent the edge of each of said head-patterns, placing a platen upon said head-core-frame, inverting the entire device, and removing said support and head-patterns from said platen, substantially as described.

2. A process of molding seamless sash weights, which consists in forming head molds in two parts and in separate casing sections, combining the parts by securing together the casing sections, forming body molds, and arranging the secured casing sections with the head molds at one end of said body molds.

3. A process of molding seamless sash weights, which consists in forming head molds within a casing section, molding figure molds within a similar casing section, securing the mold-holding casing sections together, and in arranging the secured sections within a molding flask at the ends of body molds in such manner that the metal enters the figure molds through the head molds.

4. A process of molding seamless sash weights, which consists in forming a head mold with opposite open ends, in a casing section having open sides, forming a cap mold in another casing section, securing the casing sections together with the cap mold over one of the open sides of the head-mold, forming a body mold with an open end, and placing the secured casing sections at the end of the body mold with the open side of the head mold alined therewith.

5. A process of molding seamless sash weights, which consists in forming a plurality of head molds with opposite open ends, in a casing section having open sides, forming a corresponding member of cap molds in another casing section, securing the casing sections together, with the cap molds over the outer open sides of the head molds, forming a plurality of body molds within a flask, and with outer open ends, placing the secured casing sections in the flask with the open sides of the head molds alined therewith, and pouring molten metal into said body molds.

In testimony whereof I affix my signature in presence of two witnesses.

ADDISON S. HODGES.

Witnesses:
RALPH B. MCDANIEL,
RALPH W. FOSTER.